Oct. 14, 1924.

J. B. SPOWART

EARTH AUGER

Filed Oct. 20, 1921

INVENTOR
BY JOHN B. SPOWART
Chas. E. Townsend
ATTORNEY

Oct. 14, 1924.

J. B. SPOWART

EARTH AUGER

Filed Oct. 20, 1921

INVENTOR
JOHN B. SPOWART
BY Chas. E. Townsend
ATTORNEY

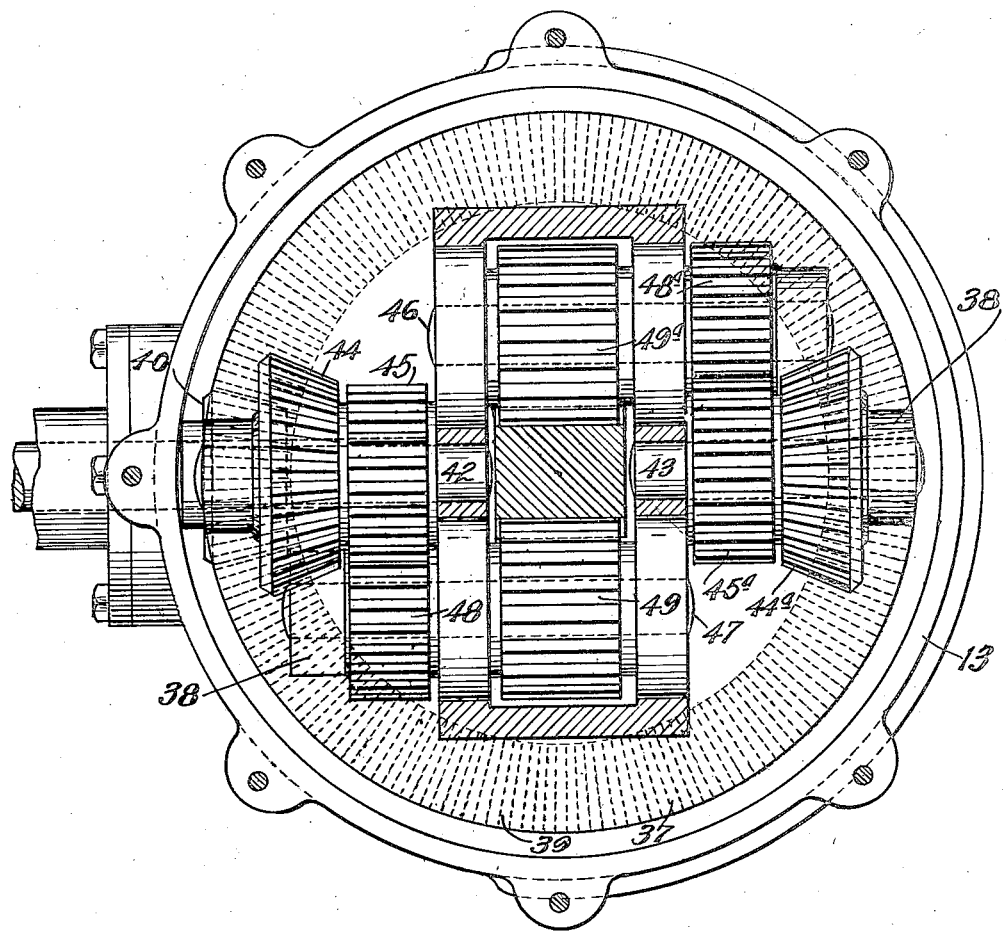

Patented Oct. 14, 1924.

1,511,433

UNITED STATES PATENT OFFICE.

JOHN B. SPOWART, OF BERKELEY, CALIFORNIA.

EARTH AUGER.

Application filed October 20, 1921. Serial No. 508,927.

*To all whom it may concern:*

Be it known that I, JOHN B. SPOWART, a citizen of the United States, residing at Berkeley, in the county of Alameda and State of California, have invented new and useful Improvements in Earth Augers, of which the following is a specification.

This invention relates to an earth auger, and especially to an auger of the portable power driven type adapted for boring holes when installing telephone poles, fence posts, and for analogous uses; the application being a continuation in part of my former application entitled "Earth auger," filed July 28, 1920, Serial No. 399,504.

One of the objects of the present invention is to provide a simple, substantial earth auger or boring machine adapted to be mounted on the chassis of an ordinary motor truck and so positioned that its operating mechanism may be coupled to the engine shaft or transmission of the truck, thereby enabling the boring operation to be effected by means of the power derived from the engine.

Another object of the invention is to provide a novel mounting for the boring mechanism whereby in case the truck is standing on sloping or otherwise uneven ground the auger and connected driving mechanism may be adjusted to assume a vertical position.

Another object of the invention is to provide a novel driving mechanism whereby rotation and automatic power advancement of the auger may be effected when boring. Further to provide means cooperating therewith for rapidly raising the auger when a hole has been completed.

Other objects will hereinafter appear.

The invention consists of the parts and the construction, combination and arrangement of parts as hereinafter more fully described and claimed, having reference to the accompanying drawings, in which—

Fig. 5 is a cross section taken on line 5—5 of Fig. 3, and showing the gear transmission whereby the auger is raised and lowered.

Figure 1:
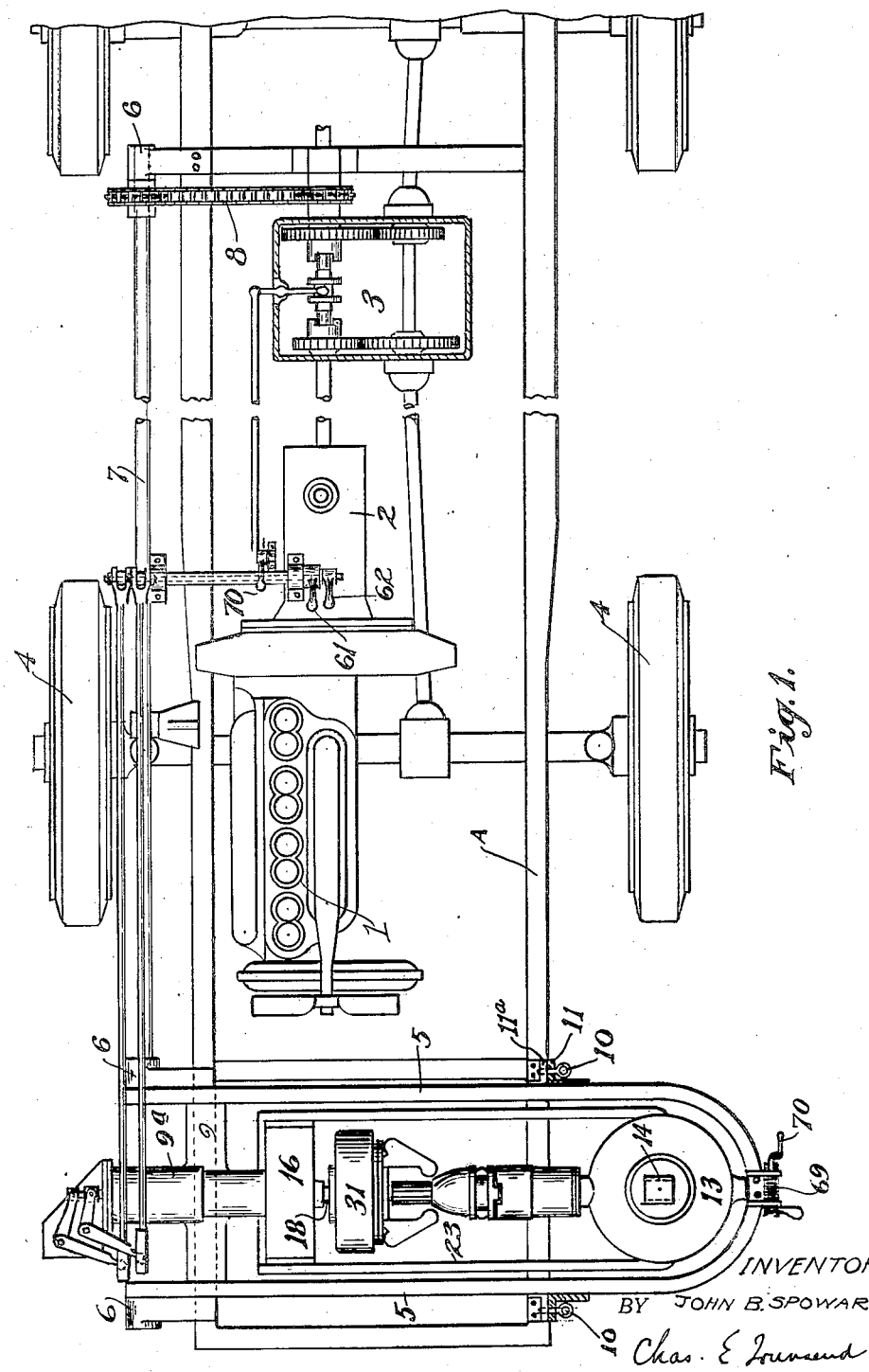
Fig. 1 is a plan view of a motor truck showing the application of the invention.
Figure 2:
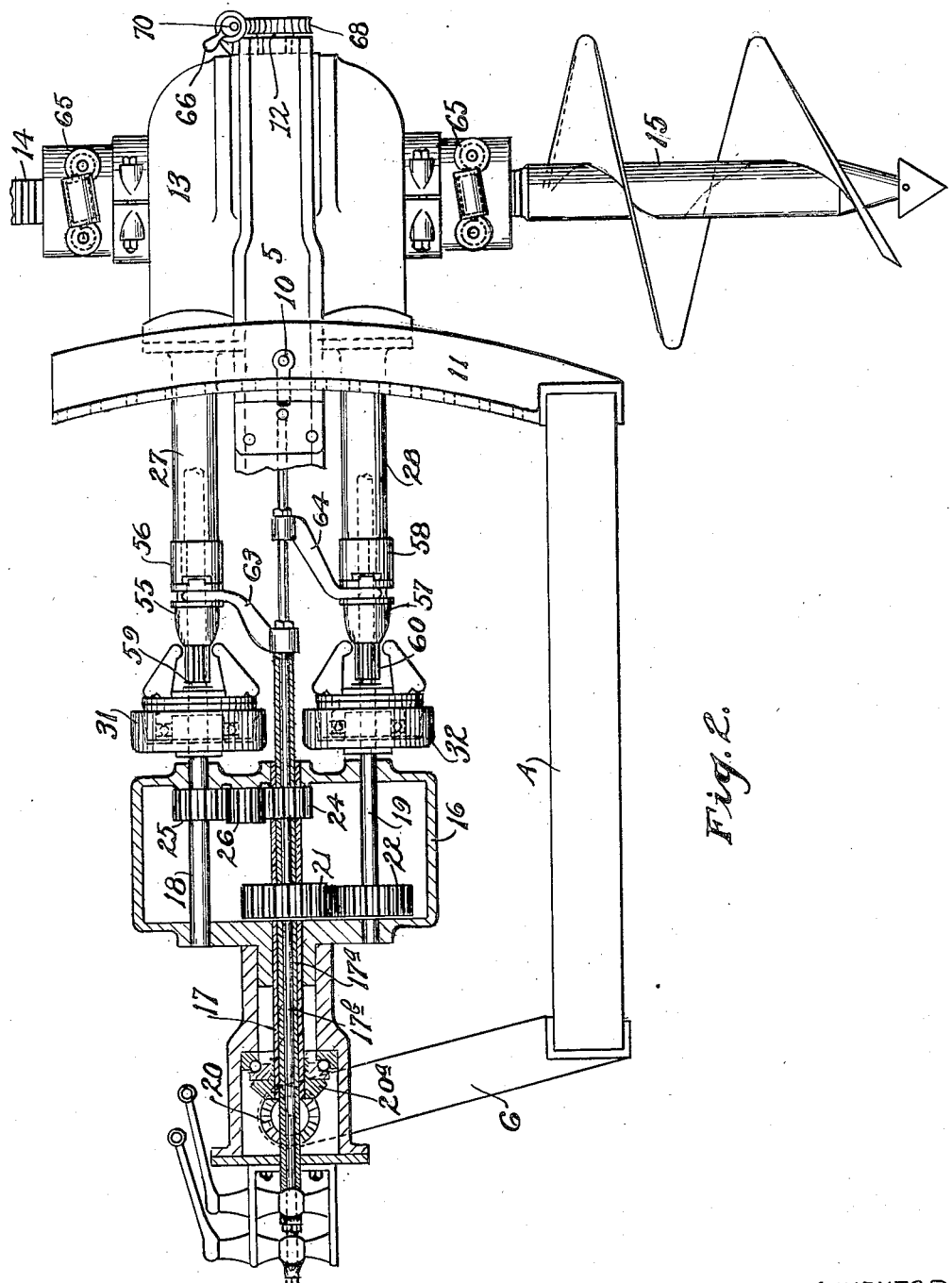
Fig. 2 is a front view of the earth auger partially in section, said view showing the driving mechanism employed.

Referring to the drawings in detail, and particularly to Figs. 1 and 2, A indicates the main frame of a motor truck, 1 the engine, 2 the transmission, 3 the auxiliary transmission, and 4 the front or steering wheels. Supported by the main frame and disposed forwardly of the engine is a U-shaped frame 5, and journalled in bearing members 6 arranged on one side of the motor truck is a shaft 7 to which power is transmitted by means of a chain 8 from the auxiliary transmission 3. One end of the frame 5 is pivotally supported in the bearing members 6, while the opposite end is free to move in a vertical direction; this movement being required to permit the boring of vertical holes when the truck is resting on sloping or otherwise uneven ground. The frame 5 is normally held in a horizontal position by means of a pair of locking pins 10 and a pair of segmental shaped standards 11. These standards are perforated at intervals to permit raising and lowering of the frame 5 when adjustment is required, and the frame is then secured by passing pins 10 through the perforations and lugs 11ª forming a part of or secured to the frame 5.

Forming a part of the frame 5, or otherwise secured thereto, is a cross arm 9, and supported thereby is a housing 9ª, which serves as a bearing for one end of a cradle frame 23. This cradle frame extends lengthwise of the frame 5 and is disposed centrally between the arms of said frame. The cradle frame as already stated is supported at one end by the housing 9ª and is freely turnable therein. Its opposite end is provided with a shaft projection 12, and this is freely turnable in the outer end of the frame 5 as shown in Figs. 1 and 2. Supported in the cradle frame is a gear transmission case 16 and a second transmission case 13. Disposed between said cases is a pair of friction clutches 31 and 32 and a pair of shafts 59 and 60.

Means, as previously stated, are provided for adjusting the position of the frame 5 so as to permit boring of vertical or slanting holes, as the case may be, and as the cradle frame is pivotally mounted within the main frame and adapted to swing about the longitudinal axis of said U-shaped frame, it is obvious that lateral adjustment of the auger may be obtained, and further that means must be provided for securing the cradle frame against turning movement when the desired adjustment has been secured. This means consists of a worm wheel 68 keyed or otherwise secured to the extension 12. Journalled above said shaft or extension 12 is a shaft 70, and secured thereon is a worm 69 which is adapted to be thrown into or out of mesh with the worm wheel 68. The shaft 70 in reality is journalled in a pair of eccentrics which in turn are turnably mounted in the bearing lugs. These eccentrics are adapted to be turned by a lever 66, and it is therefore possible to raise and lower the worm with relation to the wheel, and as shaft 70 is similarly provided with a crank or lever, it can be seen that turning movement may be imparted to the shaft and worm when it is in mesh with the wheel 68, thus permitting the cradle frame to be turned to any position desired and to be locked in said position. If it is desired to quickly swing the cradle frame, it is only necessary to raise the worm by means of the lever 66 and to manually swing the cradle frame by means of the auger to any position desired, where it may be locked by re-engagement of the worm and wheel.

Extending through the housing 9$^a$ and the transmission case 16 are three concentric shafts such as indicated at 17, 17$^a$ and 17$^b$, and extending through the transmission case and journalled therein is a pair of shafts 18 and 19. Shaft 17 is a sleeve shaft as it surrounds the shafts 17$^a$ and 17$^b$; however it is a main driving shaft as it is first of all driven by shaft 7, and secondly transmits power to shafts 18 and 19 through the gears indicated at 21, 22, 24, 25 and 26, respectively. Shaft 7 enters the housing 9$^a$ and a bevel gear 20 is secured on the inner end of said shaft. This bevel gear meshes with a second bevel gear 20$^a$ secured on the inner end of the sleeve shaft 17. Gears 21 and 24 are similarly secured on the sleeve shaft and power may thus be transmitted directly from shaft 7 to the shafts 18 and 19 in unison.

By referring to Fig. 2 it will be seen that an intermediate gear 26 is disposed between gears 24 and 25. This is of importance as shafts 18 and 19 must rotate in opposite directions when the auger is in operation as will hereinafter be described. Aligning with the shafts 18 and 19 is a pair of shafts 59 and 60, and forming a driving connection between the shafts are the friction clutches 31 and 32 previously referred to. The shafts 59 and 60 are held in alignment by journal sleeves 27 and 28 forming a part of or otherwise secured to the housing 13, and they are further held in alignment by anti-friction bearings disposed within the clutches; similar anti-friction bearings 29 and 30 being disposed at the opposite ends of the respective shafts to reduce friction to a minimum. The clutch ends of the shafts 59 and 60 are splined as shown and support a pair of jaw clutches 55, 56, 57 and 58. The stationary part of each jaw clutch is shown at 56 and 58, while the sliding parts are indicated at 55 and 57, the inner ends of said sliding members being cone shaped to enter between the expanding dogs of the clutches 31 and 32 to throw the same into or out of engagement as the case may be. The jaw clutches may be moved to throw the friction clutches 31 and 32 into engagement, and they may be moved to a neutral position, or they may be moved into engagement with their stationary cooperating parts 56 and 58 when it is desired to lock the shafts 59 and 60 against rotation. Such movement is transmitted by means of the shafts 17$^a$ and 17$^b$. Shaft 17$^a$ is a sleeve shaft and carries an operating fork 63. Shaft 17$^b$ is an ordinary solid shaft and carries a similar fork indicated at 64; the respective shafts 17$^a$ and 17$^b$ being manually actuated by a pair of hand levers 61 and 62, and a connected link and bell crank mechanism generally shown in Fig. 1.

Vertically disposed with relation to the housing 13 and extending therethrough is a shaft 14, and secured on the lower end thereof is an auger generally indicated at 15. The shaft 14 is square in cross section and is guided at its upper and lower ends by means of rollers. The rollers engaging the toothed sides of the shaft are disposed on an angle as shown, while the rollers engaging the opposite sides may be horizontally or otherwise disposed as desired. The rollers are employed for the purpose of reducing friction and wear to a minimum as the shaft is always exposed to dust, sand, etc., when the machine is in operation. The slanting of the rollers when engaging the toothed sides of the shaft is important as it presents a smooth roller surface which is always engaged by two or more teeth at one time.

Figure 3:
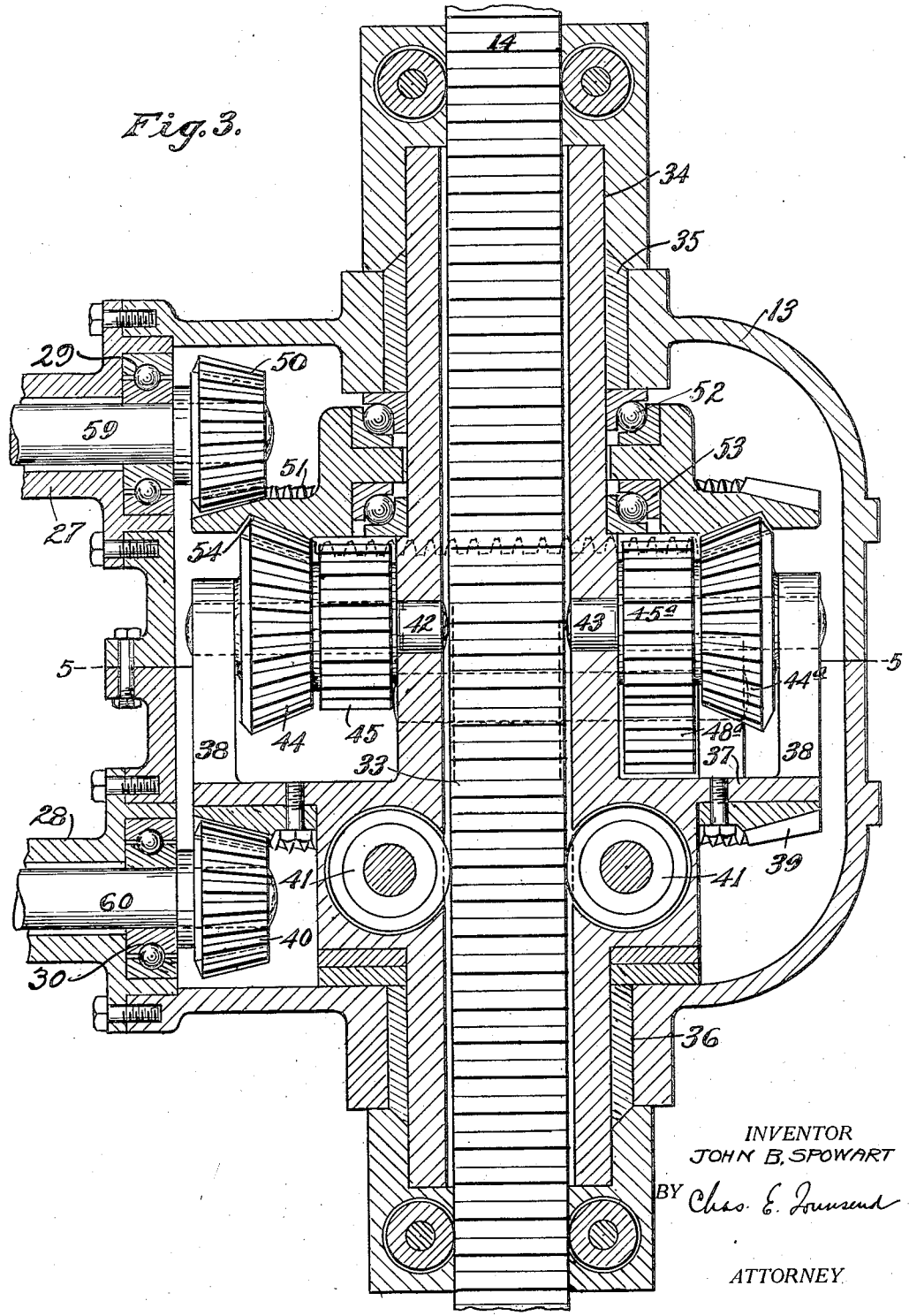
Fig. 3 is an enlarged vertical section of the auger driving and lifting mechanism.
Figure 4:
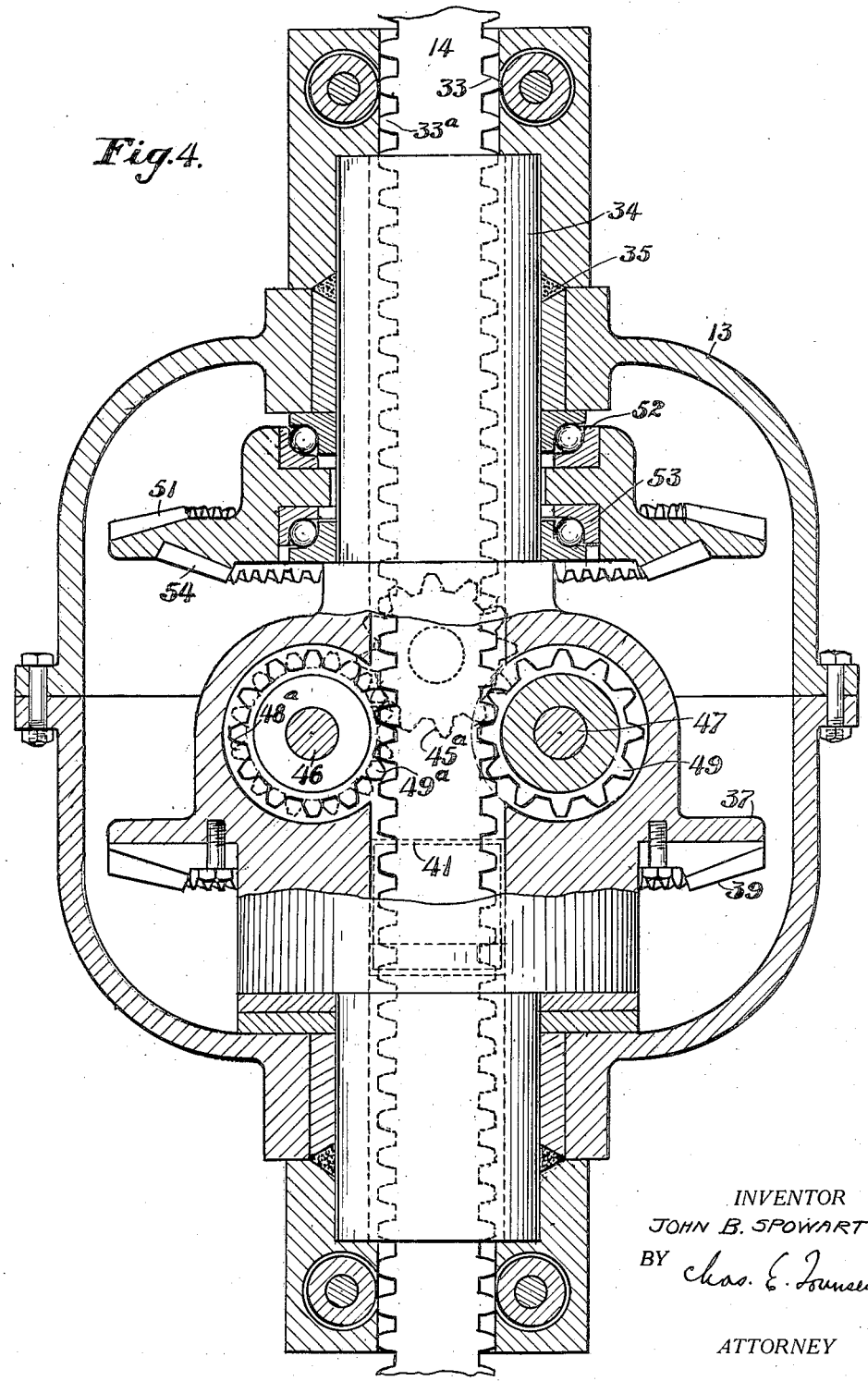
Fig. 4 is a similar view taken at right angles to Fig. 3.

Referring to Figs. 3, 4 and 5, it will be seen that the shaft is provided with two opposite racks or toothed surfaces as indicated at 33 and 33$^a$, while the adjacent faces are flat. The shaft extends through a sleeve 34 which may be termed the driving sleeve. The interior bore of the sleeve is square to receive the shaft, while the exterior of the sleeve is cylindrical as shown. The upper and lower ends of the sleeve are journalled in bushings 35 and 36, respectively, suitably secured within the housing. The lower end of the sleeve is flanged as at 37 and supports a pair of bearing lugs 38 and a ring bevel gear 39. This bevel gear intermeshes with a bevel pinion 40 secured on shaft 60, and rotary movement is in this manner transmitted to the driving sleeve 34 and the shaft extending therethrough, a positive driving connection between the sleeve 34 and shaft being formed by a pair of rollers 41 journalled in the sleeve adjacent the lower end thereof; these rollers being provided for the purpose of reducing the play between the shaft and the sleeve to reduce wear, and to permit a free up and down movement of the shaft in the sleeve.

Journalled in the bearing members 38 and in the sleeve is a pair of shafts 42 and 43. Secured on the shaft 42 is a bevel pinion 44 and a spur gear 45. Similarly secured on the shaft 43 is a bevel gear 44$^a$ and a spur gear 45$^a$. Also journalled in the bearing members 38 is a second pair of shafts 46 and 47. Secured to shaft 47 is a spur pinion 48, which intermeshes with the spur gear 45, and also secured on the shaft 47 is a spur pinion 49 which intermeshes with the rack teeth 33 formed on the shaft. Similarly secured on shaft 46 is a spur pinion 48$^a$, and also secured on the shaft 46 is a spur pinion 49$^a$ which intermeshes with the rack teeth 33$^a$ formed on the shaft. Secured to the shaft 59 is a bevel pinion 50 and intermeshing therewith is a bevel gear 51, which is freely turnable with relation to the driving sleeve 34 and anti-friction ball bearings are interposed therebetween as indicated at 52 and 53. The bevel gear 51 is in reality a ring gear and teeth are formed on its opposite sides as indicated at 51 and 54, the pinion 50 intermeshing with the teeth 51 and the bevel gears 44 and 44$^a$ with the teeth 54.

Before proceeding further with the describing of the mechanism, it may be stated that the shafts 18 and 19 revolve in opposite directions when the auger is boring, and that the shaft 18 revolves at a slightly slower speed to permit advancement or lowering of the auger while boring. This speed reduction is accomplished through the ratio formed between the gears 24, 25 and 26; the ratio being such that the revolutions of shaft 18 are slightly fewer than that of shaft 19 which is driven by the gears 21 and 22. With the shafts 18 and 19 revolving in opposite directions, and clutches 31 and 32 thrown into operation, driving sleeve 34 will be rotated as rotary movement is transmitted through the bevel gears 39 and 40. The upper ring gear 51 is simultaneously rotated through shaft 59 and the bevel pinion 50, but as the gear 51 revolves slightly slower than the gear 39, it is obvious that a slow rotary movement will be transmitted to the gears 44 and 44$^a$ secured on the shafts 42 and 43, respectively, due to the fact that these gears intermesh with the teeth of the gear 54. A slow rotary movement is thus transmitted to the shafts 42 and 43, and this movement is again transmitted through the spur gear 45 and 45$^a$ to the spur pinions 48 and 48$^a$ and the shafts 46 and 47, which in turn support the pinions 49 and 49$^a$. The slow rotary movement transmitted to these pinions, which are in engagement with the rack teeth formed on the shaft, will consequently force the shaft slowly downward during the rotation of the auger and will thus serve as an automatic feed therefor, whereby it is positively and uniformly advanced as the earth is being removed.

The operation of the machine will be as follows:

The machine is driven into position or to the point where it is desired to bore a hole and the machine is brought to a stop. The secondary transmission 3 is thrown into neutral position by means of a lever 70, and power will thus be transmitted through the chain drive 8 to the shaft 7, and then from shaft 17 to shafts 18 and 19; the neutral position of the secondary transmission being necessary as the truck would otherwise move in a forward or rearward direction, as the case might be. It is however obvious that the truck must remain stationary and the brakes applied thereto when a hole is being bored, and as a neutral position may be assumed by the mechanism contained within the transmission case 3, it is obvious that the truck will remain stationary. The position of the auger is next adjusted, first by raising or lowering the frame 5, and secondly by tilting the cradle frame 23 through means of the mechanism previously described. The friction clutches 31 and 32 are then thrown into engagement by means of the members 55 and 57; shafts 59 and 60 will rotate in opposite directions, and shaft 14, with the auger attached thereto, will be rotated, and simultaneously forced slowly in a downward direction. The rotary or downward movement of the auger is continued until the top flights become buried. It is then necessary to raise the auger to remove the dirt and this is accomplished as follows:

The friction clutch 32 is first thrown out of engagement by moving the jaw clutch 57 away therefrom. This movement of the jaw clutch is continued until engagement is made with the stationary cooperating member 58. Shaft 60 is thus locked and rotation of the auger 15 will be prevented; the clutch 31 still remaining in engagement will continue to rotate the shaft 59, and shaft 14, together with the auger carried thereby, will thus be raised in an upward direction. When the auger is lifted to within a few inches of the roller guide cap 65, clutch 32 is again thrown into engagement and power will be transmitted through shaft 60 to quickly rotate the auger; the speed of rotation being increased or decreased by manipulating the engine. The centrifugal force thus produced will free the auger of the dirt, and it can therefore be seen that it will be, practically speaking, instantly cleaned. The auger will, during the cleaning operation move downwardly a small distance during this spinning action, but the movement is so small as to not interfere with the cleaning operation. Once the auger has been raised and cleaned, lowering may be accomplished by two methods, either by gravity or power. By moving the jaw clutches 55 and 57 to neutral position, the shaft 14 and the auger will drop by gravity. If it is desired to lower the auger by power, it is accomplished by locking shaft 59 against rotation through means of the clutch members 55 and 56, and by engaging the friction clutch 32. Shaft 60 will thereby be rotated, and while it will simultaneously rotate the auger shaft, it will also feed it rapidly in a downward direction. The rack shaft can also be lowered by power without turning. This is accomplished by reversing the direction of shaft 7, said reversing movement being transmitted through the main gear transmission and the secondary transmission 3. The shaft 60 is in that instance locked against rotation by the clutch members 57 and 58, while shaft 59 is rotated by engaging the clutch 31. The rack shaft will then travel in a downward direction without being rotated. The operation of rapidly raising the auger, of rapidly lowering the same, and then slowly feeding the auger when the boring position is reached, is repeated again and again until the desired depth of hole is obtained.

Power may be employed for the purpose of adjusting the position of the frame 5. This is accomplished by allowing the auger 15 to rest on the ground. The pins 10 are then removed with relation to the segmental standards 11 and the frame may be raised by applying power through the clutch 31. As previously described when it is desired to force the rack shaft in a downward direction by means of power, as the shaft and auger do not rotate when forced in a downward direction, it is obvious that frame 5 will travel upwardly on the rack shaft until the desired position is reached, when it may be locked by re-insertion of the pins. If it is desired to lower the frame 5, merely allow clutch 31 to slip and frame 5 will lower by gravity with relation to rack 14.

From the foregoing it can be seen that power to operate the auger is derived directly from the engine through the auxiliary transmission 3. This power is transmitted through the chain drive to shaft 7, and through the bevel gears 20 and 20a is transmitted to shaft 17, which again drives the shafts 18 and 19 in directions opposite to each other. These shafts are journalled or supported in the U-shaped frame 5, and as one end thereof is freely movable in a vertical direction, it is obvious that a vertical hole may be bored in the ground upon which the truck is standing, if the ground happens to slope at right angles to the longitudinal axis of the truck. Again, if the ground is inclined either in a forward or rearward direction with relation to the truck, it is possible to permit vertical adjustment of the auger as the housing 13 carrying the auger is supported by the cradle frame which may be adjusted by means of the worm mechanism indicated at 68 and 69. Again, it should be obvious that slanting holes, whether in one direction or another, if desired, may be obtained, and practically any speed of operation may be secured by increasing or decreasing the engine speed. Holes may be spotted by the driver directly from the seat as the controlling levers, such as indicated at 61, 62 and 70, may be placed within convenient reach, and comparatively little effort should be required as practically all power is derived from the engine. Holes can be bored close to fences, and in corners, due to the position of the auger, and the driving mechanism supporting the same. The whole mechanism may be detached and the general utility or use of the truck should therefore not be impaired when boring operations are not required.

While certain features of the present invention are more or less specifically illustrated, I wish it understood that various changes in form and proportion may be resorted to within the scope of the appended claims, similarly that the materials and finish of the several parts employed may be such as the experience and judgment of the manufacturer may dictate or varying uses may demand.

Having thus described my invention, what I claim and desire to secure by Letters Patent is—

1. In an earth boring means, the combination with the frame of a motor truck of a U-shaped frame having its terminals pivotally attached to permit its opposite end to be free to move in a substantially vertical plane, a power transmission pivotally supported by the movable end of the frame, said transmission being disposed longitudinally of the frame and adapted to rock transversely thereof, means for transmitting engine power from the truck to operate said power tranmsission, and an auger connected with said transmission and adapted to be rotated thereby for boring.

2. In a machine of the character described, an auger, and means for transmitting engine power to rotate the auger and simultaneously feed it downwardly, said driving means being disengageable to release the auger so that it may be dropped by gravity and without rotation.

3. In a machine of the character described, an auger, means for transmitting engine power to rotate the auger and simultaneously feed it downwardly at one speed, and means for feeding the auger downwardly with accelerated speed, but with a slow rotation.

4. In an earth boring machine the combination with the main frame of a motor truck, of a frame pivotally attached thereto at one end and having its other end adjustable in a vertical direction with relation to the frame of the truck, a casing secured in the pivotally mounted frame, a second casing secured in said frame and at the outer movable end thereof, an upper and a lower shaft journalled in the first named casing and extending into the second named casing, a driving shaft journalled in the first named casing, means for transmitting engine power from the truck to drive said shaft, means for transmitting power from the driving shaft to the upper and lower shafts, said means including means for driving one shaft reversely with respect to the other shaft, an auger supported by the second named casing, and means in said casing actuated by the upper and lower shafts for rotating the auger, for advancing the same and for raising the same.

5. In an earth boring machine the combination with the main frame of a motor truck, of a frame pivotally attached thereto at one end and having its other end adjustable in a vertical direction with relation to the frame of the truck, a casing secured in the pivotally mounted frame, a second casing secured in said frame and at the outer movable end thereof, an upper and a lower shaft journalled in the first named casing and extending into the second named casing, a driving shaft journalled in the first named casing, means for transmitting engine power from the truck to drive said shaft, means for transmitting power from the driving shaft to the upper and lower shafts, said means including means for driving one shaft reversely with respect to the other shaft, an auger supported by the second named casing, means in said casing actuated by the upper and lower shafts for rotating the auger, for advancing the same and for raising the same, and a clutch mounted on the respective upper and lower shafts to break the drive through either.

6. In an earth boring machine of the character described, a casing, a driving sleeve journalled therein, a shank extending through the sleeve, a driving connection between the sleeve and the shank, means within the casing for raising and lowering the shank, an auger secured on the lower end of the shank, and means within the casing for rotating the sleeve and the shank.

7. In an earth boring machine of the character described, a casing, a driving sleeve journalled therein, a shank extending through the sleeve, a driving connection between the sleeve and the shank, rack teeth formed in opposite faces of the shank, gears carried by the driving sleeve intermeshing with said rack teeth, means for rotating the driving sleeve and the shank extending therethrough, and other means for transmitting a rotary movement to the gears intermeshing with the rack teeth to raise or to lower the shank and the auger carried thereby.

8. In an earth boring machine of the character described a casing, a driving sleeve journalled therein, a shank extending through the sleeve, a driving connection between the sleeve and the shank, said shank being square in cross section and vertically movable in the sleeve, a gear secured on the sleeve, a driving pinion intermeshing therewith to rotate the driving sleeve and the shank extending therethrough, rack teeth formed in opposite faces of the shank, gears carried by the sleeve, intermeshing with said rack teeth, a gear freely turnable about the sleeve, a second pair of gears carried by the sleeve adapted to transmit rotary movement to the rack engaging gears, and means for transmitting movement from the turnably mounted gear to the last named gears carried by the sleeve to raise or to lower the shank.

9. In an earth boring machine of the character described a casing, a driving sleeve journalled therein, a shank extending through the sleeve and vertically movable therein, a driving connection between the sleeve and the shank, means for rotating the sleeve and the shank, and means cooperating therewith for gradually lowering the shank while the sleeve and shank are rotating.

10. In an earth boring machine of the character described a casing, a driving sleeve journalled therein, a shank extending through the sleeve and vertically movable therein, a driving connection between the sleeve and the shank, means for rotating the sleeve and the shank, means cooperating therewith for gradually lowering the shank while the sleeve and shank are rotating, and other means cooperating with the last means for raising the shank.

11. In an earth boring machine of the character described a casing, a driving sleeve journalled therein, a shank extending through the sleeve and vertically movable therein, a driving connection between the sleeve and the shank, means for rotating the sleeve and the shank, means cooperating therewith for gradually lowering the shank while the sleeve and shank are rotating, and a universal mounting for the casing to permit angular adjustment of the shank and the auger carried thereby.

12. In an earth boring machine, a casing, a driving sleeve journalled therein, a shank extending through the sleeve and vertically movable therein, a driving connection between the sleeve and the shank, a pair of driving shafts entering the casing, means for transmitting power from one shaft to rotate the driving sleeve and the shank extending therethrough, and means for transmitting power from the other shaft to gradually lower the shank during the rotation of the sleeve and shank.

13. In an earth boring machine, a casing, a driving sleeve journalled therein, a shank extending through the sleeve and vertically movable therein, a driving connection between the sleeve and the shank, a pair of driving shafts entering the casing, means for transmitting power from one shaft to rotate the driving sleeve and the shank extending therethrough, means for transmitting power from the other shaft to gradually lower the shank during the rotation of the sleeve and shank, and means for disconnecting and securing the other shaft to raise the shank within the sleeve.

14. A power driven auger of the character described comprising a casing, a shaft extending therethrough, an auger carried by the shaft, a gear transmission in the casing adapted to impart a rotary and a vertical movement to the shaft and auger, means for transmitting power to the gear transmission, a support for the casing, means permitting universal movement of the casing with relation to the support, and means for locking the casing against movement.

15. A power driven auger of the character described comprising a casing, a shaft extending therethrough, an auger carried by the shaft, a gear transmission in the casing adapted to impart a rotary and a vertical movement to the shaft and auger, means for transmitting power to the gear transmission, a support, a frame pivotally attached to the support at one end and carrying the casing at the opposite end, means permitting vertical movement of the free end of the frame and the casing supported thereby, means for locking the frame and casing against vertical movement, a pivotal support in the frame for the casing permitting rocking movement of the casing, and means for locking the casing against rocking movement.

16. A power driven auger of the character described comprising a casing, a shaft extending therethrough, an auger carried by the shaft, a gear transmission within the casing adapted to impart a rotary movement to the shaft, a second gear transmission within the casing adapted to impart vertical movement to the shaft, separate driving shafts entering the casing and actuating each transmission, means for driving said shafts in unison and a compound clutch on each shaft for transmitting power thereto or for locking the shaft against revolution.

17. A power driven auger of the character described comprising a casing, a shaft extending therethrough, an auger carried by the shaft, a gear transmission within the casing adapted to impart a rotary movement to the shaft, a second gear transmission within the casing adapted to impart vertical movement to the shaft, separate driving shafts entering the casing and actuating each transmission, a common drive shaft, means for transmitting power therefrom to the last named shafts and in opposite directions, and a compound clutch on each of said last named shafts, said clutches adapted to transmit power to each shaft or lock said shafts against rotation.

18. A power driven auger of the character described comprising a casing, a shaft extending therethrough, an auger carried by the shaft, a gear transmission within the casing adapted to impart a rotary movement to the shaft, a second gear transmission within the casing adapted to impart vertical movement to the shaft, separate driving shafts entering the casing and actuating each transmission, a common drive shaft, means for transmitting power therefrom to the last named shafts and in opposite directions, a compound clutch on each of said last named shafts, said clutches adapted to transmit power to each shaft or lock said shafts against rotation, and manually operated means for operating said clutches independently of each other.

19. A power driven auger of the character described comprising a casing, a shaft extending therethrough, an auger carried by the shaft, a gear transmission within the casing, adapted to impart a rotary movement to the shaft, a second gear transmission within the casing adapted to impart vertical movement to the shaft, separate driving shafts entering the casing and actuating each transmission, a common drive shaft, means for transmitting power therefrom to the last named shafts and in opposite directions, a compound clutch on each of said last named shafts, said clutches adapted to transmit power to each shaft or lock said shafts against rotation, manually operated means for operating said clutches independently of each other, a universal support for the main drive shafts, the second named shafts, the casing, and the auger shaft carried thereby, and means for locking said assembled unit against universal movement.

JOHN B. SPOWART.